UNITED STATES PATENT OFFICE

2,466,505

FLUOBORATE GLASSES

Kuan-Han Sun, Rochester, N. Y., assignor to Eastman Kodak Company, Rochester, N. Y., a corporation of New Jersey No Drawing. Application April 6, 1946, Serial No. 660,307

6 Claims. (Cl. 106—47)

This invention relates to fluoborate optical glass and particularly to such glass having a high index of refraction, greater than 1.9, and high dispersion or low Abbé value ($\nu$), less than 25.

The glasses herein described are primarily of fluoborate type and contain in combined form: boron, fluorine, and oxygen, and also two or more of the following elements: divalent lead, barium, lanthanum, titanium, and thorium. In the examples herein given the lead and titanium are introduced as oxides, and barium, lanthanum, and thorium as fluorides; although, as is usual in glass making, the ingredients may be introduced in other forms. As examples, boric acid, $H_3BO_3$, may be used for $BO_{1.5}$, and $Pb_3O_4$ for PbO. Although a glass may be formed from a batch containing the various ingredients as expressed in the batch formulas, these individual ingredients do not in fact exist as such in the final product. It is more nearly correct to consider these glasses as an irregular aggregate of positive and negative ions. It is also convenient, particularly in using "cationic" percentage or electropositive atomic percentage, to adopt the form $BO_{1.5}$ instead of the equally empirical formula $B_2O_3$.

A few typical examples are given in the following table with composition of the batch by weight percentage designated W and the cationic or "mole" percentage designated M. Because of the convention here adopted ($BO_{1.5}$ instead of $B_2O_3$) which always has one cation per "mole," the cationic percentages are equal to the "mole" percentages, and this is to be understood in interpreting the claims. The values of $\nu$ and of $n_D$, the refractive index for the D line, are also given and the atomic or ionic ratio of fluorine to boron, F/B.

A small addition of various compatible components is considered within the scope of the invention and, in fact, is frequently helpful to prevent devitrification and to increase the chemical stability.

| Example | 1 | | 2 | | 3 | | 4 | | 5 | | 6 | |
|---|---|---|---|---|---|---|---|---|---|---|---|---|
| | W | M | W | M | W | M | W | M | W | M | W | M |
| PbO | 65 | 36.9 | 70 | 40.0 | 70 | 41.4 | 55 | 33.3 | 51 | 31.1 | 60 | 35.0 |
| TiO$_2$ | 10 | 15.9 | 10 | 16.1 | 10 | 16.5 | 10 | 16.9 | 10 | 17.0 | 10 | 16.2 |
| BO$_{1.5}$ | 10 | 36.3 | 10 | 36.9 | 10 | 36.9 | 10 | 37.9 | 10 | 38.8 | 10 | 37.3 |
| BaF$_2$ | 15 | 10.9 | | | | | | | | | 5 | 3.8 |
| LaF$_3$ | | | 10 | 6.6 | | | | | | | 5 | 3.4 |
| ThF$_4$ | | | | | 10 | 4.2 | 25 | 11.0 | 29 | 12.8 | 10 | 4.3 |
| F/B | 0.60 | | 0.54 | | 0.44 | | 1.13 | | 1.31 | | 0.97 | |
| n$_D$ | 1.9273 | | 1.9701 | | | | 1.9864 | | 1.965 | | 1.9665 | |
| $\nu$ | 21.8 | | 21.2 | | | | 22.2 | | 23.0 | | 21.7 | |

In making the glasses, I preferably use a vessel having a silica content greater than 96 per cent. In making these glasses, the ingredients, minus fluorides, are melted in a glass vessel of the type mentioned to a fluid liquid first. For a 50 gram melt, the melting takes about 5 minutes at 1200° C., longer for larger melts or lower temperatures. Temperatures as low as 1050° C. may be used. The fluorides are then dumped in while the melt is stirred or shaken. The fluorides dissolve readily in the melt. After a few minutes, the fluid liquid may be shaken until a clear, transparent, and fairly viscous liquid is obtained. This liquid is then poured into a stainless mold previously heated to about 400–500° C. The glass is allowed to cool slowly, when clear and slightly yellowish glass is obtained. These glasses are durable against moisture attack.

The high silica glass vessel is usually not seriously attacked. The glass may be made also by pouring the liquid glass after the complete solution of fluorides from the vessel to a platinum vessel. The liquid is then stirred to uniformity in the platinum vessel and poured to a mold.

The invention herein disclosed is a specific form of the invention generically claimed in my copending application, Serial No. 646,681, filed February 9, 1946, now Pat. No. 2,456,033 granted Dec. 14, 1948. Although the optical values here obtained fall below the line ($n_D=2.2-0.01\ \nu$) mentioned therein, and the amount of boron oxide can be as low as 35 ionic per cent, whereas in the examples of my previous application the lowest is about 50, I consider the present disclosures as within the broad conception of that invention. It is to be further understood that the formulas given are by way of example and that the proportions of the ingredients may vary to a certain extent; that is, the amount of boron oxide may be considerably greater than in the examples, and the titanium oxide may vary considerably and may even be omitted entirely, and a useful glass will result.

When in the claims I refer to "fluoride selected from" enumerated fluorides, I do not mean "a fluoride," but intend to include one or more fluorides.

Having thus described my invention, what I claim is:

1. A fluoborate optical glass having a value for $n_D$ greater than 1.9 and a value for $\nu$ less than 25 comprising essentially in combined form fluorine, boron, and oxygen and at least two of the metals selected from the group consisting of the following metals: barium, lanthanum, titanium, thorium, and divalent lead, the mole percentage of boron oxide being between 30 and 50 and the mole percentage of fluoride being between 3 and 15.

2. A fluoborate optical glass consisting of the fused, heat-reaction product of a batch comprising essentially in mole percentage: boron oxide, between 35 and 50; lead oxide, between 30 and 42; titanium oxide, between 10 and 20; and fluoride, between 3 and 15.

3. A fluoborate optical glass consisting of the fused, heat-reaction product of a batch comprising essentially in mole percentage: boron oxide, between 35 and 50; lead oxide, between 30 and 42; titanium oxide, between 10 and 20; and fluoride, between 4 and 15, of which between 4 and 15 is thorium fluoride.

4. A fluoborate optical glass consisting of the fused, heat-reaction product of a batch comprising essentially in percentage by weight: boron oxide, 10 per cent; titanium oxide, 10 per cent; lead oxide, 50 to 70 per cent; and fluoride selected from the group consisting of the fluorides of barium, lanthanum, thorium, and lead, and mixtures thereof, 5 to 30 per cent; the ratio of fluorine to boron lying between 0.3 and 1.35, the glass having a value for $n_D$ greater than 1.9 and a value for $\nu$ less than 25.

5. A fluoborate optical glass consisting of the fused, heat-reaction product of a batch comprising essentially in percentage by weight: boron oxide, 10 per cent; titanium oxide, 10 per cent; lead oxide, 50 to 70 per cent; and thorium fluoride, between 5 and 30 per cent.

6. A fluoborate optical glass consisting of the fused, heat-reaction product of a batch comprising essentially in mole per cent: boron oxide, between 35 and 50 per cent; lead oxide, between 30 and 45 per cent; titanium oxide, between 10 and 20 per cent; and lanthanum fluoride, between 3 and 15 per cent.

KUAN-HAN SUN.

REFERENCES CITED

The following references are of record in the file of this patent:

UNITED STATES PATENTS

| Number | Name | Date |
|---|---|---|
| 2,394,502 | Weyl et al. | Feb. 5, 1946 |

OTHER REFERENCES

Ser. No. 395,364, Berger et al. (A. P. C.), published May 11, 1943.